United States Patent [19]

Rockland et al.

[11] 4,159,351

[45] Jun. 26, 1979

[54] PROCESS FOR PREPARING MIXED BEAN SALADS

[75] Inventors: Louis B. Rockland, Moraga; Eufrocina M. Zaragosa, Albany, both of Calif.

[73] Assignee: The United States of America as represented by the Secretary of Agriculture, Washington, D.C.

[21] Appl. No.: 873,570

[22] Filed: Jan. 30, 1978

[51] Int. Cl.$^2$ .............................................. A23L 1/20
[52] U.S. Cl. ................................... 426/634; 426/271; 426/629; 426/331
[58] Field of Search ............... 426/629, 634, 331, 271

[56] References Cited

U.S. PATENT DOCUMENTS

| | | | |
|---|---|---|---|
| 3,318,708 | 5/1967 | Rockland et al. | 426/271 |
| 3,352,687 | 11/1967 | Rockland et al. | 426/271 |
| 3,635,728 | 1/1972 | Rockland | 426/271 |
| 3,869,556 | 3/1975 | Rockland et al. | 426/634 |

*Primary Examiner*—Joseph M. Golian
*Attorney, Agent, or Firm*—M. Howard Silverstein; David G. McConnell; Theodore J. Leitereg

[57] ABSTRACT

Mixed bean salad is prepared by a process wherein different varieties of beans are independently rendered quick-cooking and then independently precooked for a period of time sufficient to remove extractable pigments therefrom. The precooked beans, again independently, are cooled rapidly and then mixed together in a marinating liquid. Finally, the beans are finish-cooked in the marinating liquid.

4 Claims, No Drawings

PROCESS FOR PREPARING MIXED BEAN SALADS

BACKGROUND OF THE INVENTION

1. Field of the Invention

This invention relates to and has among its objects the provision of novel mixed bean salads and novel methods of making them. Further objects of the invention will be evident from the following description wherein parts and percentages are by weight unless otherwise specified.

2. Description of the Prior Art

The general procedure followed by most consumers in preparing a mixed bean salad begins with individual cans of beans. For example, garbanzo beans, dark red kidney beans and yellow wax beans, each from their own can, are drained, mixed together, and marinated. However, the combination method produces relatively large amounts of salad mixture and is thus avoided except for major events, such as large family picnics, etc.

Another approach followed by the consumer is to cook each variety of bean from the dry state and then mix and marinate them. This technique, though, is reserved for the overly-ambitious mixed bean salad lover.

Commercial mixed bean salads are available in jars or cans. The manufacturer separately retorts large cans of each bean variety to be used in the salad. This cooking procedure may require from 30 minutes to 4 hours, usually about 2 to 3 hours. Each can is stored and then opened at the desired time. The beans are drained and the cooking brine is discarded. Then, the different varieties of beans are mixed together in marinating liquid with other colorful sliced vegetables and placed in smaller cans or jars for retail sale.

Different varieties of uncooked, dry beans cannot be mixed and then cooked. First of all, the dry beans vary drastically in cooking times. Thus, if the mixture is heated for a period long enough to cook all of the beans, the beans which require lesser cooking time will have a poor texture unsuitable for a mixed bean salad. Second, each bean variety has a characteristic color, some light, some dark. When a mixture of beans is cooked the darker colors are extracted into the cooking medium and are absorbed by the lighter colored beans, thus yielding a product with unacceptable appearance.

The commercial procedure is time-consuming and expensive. Furthermore, pollution is increased because the cooking and canning liquid from individual bean varieties and the cans themselves must be discarded. The involved handling and packing procedure contributes to the overall high price of the commercial canned mixed bean salads.

SUMMARY OF THE INVENTION

The invention described herein provides a means for obviating the problems outlined above. A mixed bean salad can be prepared by a process wherein individual varieties of beans are first treated to render them quick-cooking. Afterwards, the so-treated beans are independently cooked in water for a period of time sufficient to remove extractable pigments therefrom. The beans are rapidly cooled and drained. Different varieties of beans are mixed together proportionally and placed in a container together with marinating liquid and other ingredients. The container is sealed and then retorted to finish the cooking of the beans and to sterilize the contents of the container.

A primary advantage of the invention is that a mixture of different bean varieties that are only partially cooked can be employed to make a mixed bean salad. Consequently, the laborious and costly procedure presently used in the art is no longer necessary to prepare a suitable product. The bean salad in accordance with the invention is more economically attractive than known products. It should be noted, in addition, that the mixed bean salad of the invention has an excellent texture, flavor, and appearance.

Another advantage of the invention is reduction in pollution because less processing liquid is employed in the instant process is compared to that used in conventional methods. As a result, obvious economic advantages are also realized.

DESCRIPTION OF THE PREFERRED EMBODIMENTS

Basically, the objects of the invention are attained by applying the following operations. Beans are first treated to render them quick-cooking. Methods for achieving this result are described generally in U.S. Pat. Nos. 3,869,556, 3,318,708, 3,352,687, and 3,635,728. In accordance with the patented methods beans first may be blanched in boiling water and then are soaked in approximately three times their volume of water containing small amounts of sodium chloride, sodium bicarbonate, sodium carbonate, and occasionally, sodium tripolyphosphate. Soaking is carried out for a period of about 2 to 24 hours (depending upon the bean variety) and usually at ambient temperature and atmospheric pressure. The soaked beans are removed from the medium and may be rinsed with water to prepare them for the next step in the process of the invention.

After the individual varieties of beans are rendered quick-cooking, they are cooked independently in water for a period of time sufficient to remove extractable pigments therefrom. Usually, the beans are cooked for a period of about 1 to 10 minutes during which time the leachable coloring elements are removed from the beans. The temperature in the cooking step is from about 90°–100° C. The time of cooking varies with the variety of bean and in any particular case can be ascertained using small pilot trials in accordance with the above procedure.

Not only does the short precook eliminate discoloration of the beans, it also enhances the texture of the finish-cooked beans. The final texture of each bean is uniformly tender yet firm as a result of the short precooking step.

It should be noted that the short precook is necessary in the process of the invention. If non-precooked beans are retorted to finish-cook them, both the appearance and texture of the individual beans are unacceptable.

The partially cooked beans are separated from the cooking medium and rapidly cooled by contacting them with cold water, preferably containing a small amount of acid such as dilute acetic acid (vinegar) or the like. The concentration of acid in the cold water should be from about 1 to 50%, based on the weight of water. The rapid cooling in a slightly acidic medium firms the seed coats and cotyledons of the beans and prevents fragmentation thereof in the final product. In this way the appearance and texture of individual beans in the final product will be maintained. The cooled beans are then separated from the cooling liquid.

Individual varieties of beans prepared as above are mixed together in definite proportions and the mixture is placed in a container together with a marinating liquid and other vegetables. The proportion of beans, the nature of the marinating liquid and the type of other vegetables are chosen in accordance with known procedures. Typically, a mixed bean salad might have the following composition:

| Ingredient | Weight |
|---|---|
| Red kidney beans | 450 g |
| Garbanzo beans | 450 g |
| Lima beans | 200 g |
| Small white beans | 200 g |
| Yellow wax beans | 350 g |
| Green string beans | 350 g |
| Carrot slices | 60 g |
| Pimentos | 64 g |
| Spices | 9 g |
| Marinating liquid with vinegar base | 1020 ml |

After the container is sealed, it is retorted to finish-cook the beans and to sterilize its contents. In general, the temperature of the retort is from about 107° to 125° C. for a period of time of about 8 to 25 minutes under a pressure of approximately 5 to 15 psig. Preferably, the container is retorted in a rotary autoclave or the like at a low speed, e.g., 2.5 to 10 rpm. The containers are then ready for distribution to the consumer.

The product of the invention has a excellent color, flavor, texture, and appearance. Both light and dark colored beans maintain their respective colors. The beans are firm yet tender and do not slough or fall apart in the finished product. In addition, the natural flavor of the beans, supplemented of course by that of the marinating liquid, is maintained.

The invention has wide utility and products of the invention can be prepared from beans of all types, i.e., beans of the genus Phaseolus including common beans such as large white, small white, pinto, red kidney, cranberry, lima, etc.; the genus Pisum including smooth and wrinkled peas; the genus Vigna including the blackeye beans (or blackeye peas as they are often termed); the genus Lens including lentils; the genus Cicer including garbanzo or chick peas; the genus Soja, that is, soybeans, etc.

EXAMPLES

The invention is further demonstrated by the following illustrative examples.

EXAMPLE 1

Five Bean Salad

A. Two kilograms each of dry California small white and pink beans and 4 kilograms each of baby Lima, garbazo, and dark red kidney beans are each processed separately to render them quick-cooking. The procedures outlined in U.S. Pat. Nos. 3,869,556, 3,318,708, 3,352,687, and 3,635,728, were followed. Some bean varieties were blanched in boiling water. All beans were soaked in three times their weight of solution for 24 hours at 21.1° C. Each variety of beans was precooked separately in 5 volumes of boiling water in an open kettle. The soaking conditions and blanch, and precooking times are summarized in the following table.

| Processing conditions | Variety | | | | |
|---|---|---|---|---|---|
| | California small white | Pink | Baby lima | Garbanzo | Dark red kidney |
| Soak solution (%) | | | | | |
| Blanch time (min) | 1 | 3 | 2 | 0 | 1 |

-continued

| Processing conditions | Variety | | | | |
|---|---|---|---|---|---|
| | California small white | Pink | Baby lima | Garbanzo | Dark red kidney |
| Soak solution (%) | | | | | |
| Sodium chloride | 2.00 | 2.00 | 2.00 | 2.00 | 2.00 |
| Sodium bicarbonate | 0.45 | 0.45 | 0.45 | 0.375 | 0.45 |
| Sodium carbonate | 0.15 | 0.15 | 0.15 | 0.125 | 0.15 |
| Sodium tripolyphosphate | 0.10 | 0.10 | 0.00 | 0.00 | 0.10 |
| Water | 97.3 | 97.3 | 97.4 | 97.5 | 97.3 |
| Precooking time (min) | 4 | 4 | 3 | 7 | 4 |

The cooked beans were drained immediately and covered in a cold aqueous solution of 1% acetic acid. After cooling, the beans were drained and each variety added to a series of No. 10 enamel lined cans. The proportion of precooked beans was as follows: 220 g. of California small white beans, 200 g. of pink beans, 420 g. of baby Lima beans, 420 g. of garbanzo beans, and 420 g. of dark red kidney beans. A mixture of herbs and spices of the following composition was added to the cans: 7.5 g. of dry chopped onions, 750 mg. of dry oregano, 500 mg. of dry parsley, and 50 mg. of dry chives.

Finally, a marinade was added to fill each can (total=18 cans). The marinade had been previously heated to 71°-82° C. and had the following composition: sodium chloride (960 g.), granulated sugar (600 g.), dry mustard (superfine, 64 g.), garlic powder (46 g.), white pepper (44 g.), and Cayenne pepper (2.4 g.), glacial acetic acid (50 ml.), and water (38 l.).

The cans were sealed on a Rooney Automatic Can Sealing Machine. Then, the cans were heated in an FMC Rotary Retort at 3 rmp and 110° C. for 16 minutes and cooled in running water to about 38° C.

One can was selected at random from the above group and opened. The mixed bean salad had an excellent color, flavor, appearance, and texture. Each variety of bean displayed vivid characteristic color. The beans were firm, yet tender, with seed coats and cotyledons intact. The natural flavor of each variety of bean was easily ascertained though accented by the marinating liquid.

The above experiment was repeated except that the precooking and cooling treatments were omitted. The final product had a poor appearance, color, texture, and flavor. The light-colored beans were discolored by the pigments from the dark-colored beans. The seed coats and cotyledons of the beans were fragmented. Some of the beans had a mushy texture.

Having thus described our invention, we claim:
1. A process for preparing a mixed bean salad, which comprises
   (a) independently treating different varieties of beans to render them quick-cooking,
   (b) independently precooking the so-treated varieties of beans in water at a temperature of about 90°-100° C. for a period of time sufficient to remove extractable pigments therefrom, that is, for a period of about 1 to 10 minutes,
   (c) independently rapidly cooling the precooked varieties of beans by contacting them with cold water,
   (d) mixing the so-treated beans together in marinating liquid with a vinegar base,
   (e) sealing the mixture in a container, and
   (f) heating the sealed container to finish-cook the so-mixed beans and to sterilize the mixture.
2. The process of claim 1 wherein the cold water contains about 1 to 5% of an acid, based on the weight of water.
3. The process of claim 2 wherein the acid is acetic acid.
4. The process of claim 1 wherein the mixture is heated in Step f by retorting at a temperature of about 107°-125° C. and a pressure of about 5 to 15 psig for a period of about 8 to 25 minutes.

* * * * *